July 31, 1934.  C. S. HORNBERGER  1,968,039
EDUCATIONAL APPARATUS
Filed Feb. 6, 1933
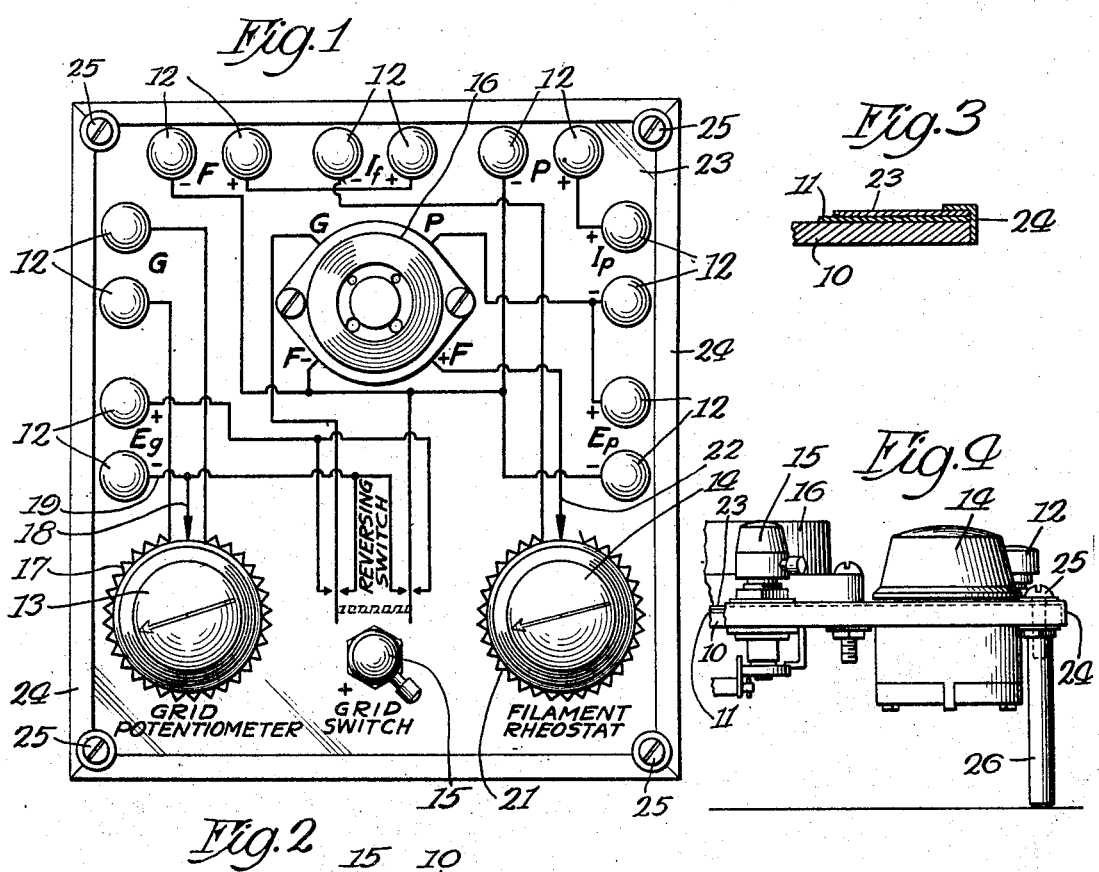
Inventor
Carl S. Hornberger Patented July 31, 1934

1,968,039

UNITED STATES PATENT OFFICE 1,968,039

EDUCATIONAL APPARATUS

Carl S. Hornberger, Glen Ellyn, Ill., assignor to Central Scientific Company, a corporation of Illinois Application February 6, 1933, Serial No. 655,423

8 Claims. (Cl. 35—12)

When students are required to perform experiments with electrical apparatus, it often happens that the uninitiated manipulate the circuit controlling devices without the slightest idea of what effect the manipulation will have on the circuit. They are totally unable to visualize the circuit and, therefore, gain little from the experiments.

In a few isolated cases, white lines have been inscribed on the front panels of dark colored instrument boxes to indicate in a general way the electrical connections within the box. To mark electrical apparatus in this manner is very expensive and the process cannot be used where large quantities of apparatus are being manufactured.

The present invention provides a simple, clear, and concise manner for indicating the circuit diagram on any particular piece of electrical apparatus. It is readily adaptable to mass production methods and the costs of manufacture are very low.

The principal object of this invention, therefore, is to provide, in combination with educational apparatus involving electrical circuits, a simple and inexpensive means for indicating the circuit, or a part of the circuit, and the relationship of the circuit controlling devices to one another and to the circuit.

Further and other objects and advantages will become apparent as the disclosure proceeds and the description is read in conjunction with the accompanying drawing, in which Fig. 1 is a plan view of tube testing apparatus which illustrates the general concept of this invention;

Fig. 2 is a bottom plan view of the apparatus showing the circuit controlling devices joined together by conductors in substantial accordance with the circuit diagram;

Fig. 3 is a fragmentary, sectional view of a corner of the apparatus and illustrates one embodiment of the invention;

Fig. 4 is a fragmentary, side elevational view of the apparatus shown in Fig. 1; and Fig. 5 is a perspective, fragmentary view showing another embodiment of the invention.

It will be understood that the following detailed description of specific apparatus is for the purpose of disclosure only, for the invention is equally applicable to all types of electrical apparatus which may be used in educational institutions. For example, it may be used on resistance boxes, Wheatstone bridges, ammeters, voltmeters, and other apparatus designed to demonstrate particular electrical phenomena. It may also be used to demonstrate pneumatic systems, vacuum systems and many other kinds of circuit relationships.

Referring now to the drawing, the reference character 10 designates a panel of rigid material, such as Masonite, on the upper face of which is laid a sheet 11 which bears the diagram for a circuit used in testing vacuum tubes. The sheet may be a blue print, photostat, photograph, photolithograph, or other photo-diagram, or the diagram may be printed, mimeographed, or otherwise impressed upon the sheet. The sheet is secured to the panel 10 by an adhesive.

The diagram on the sheet 11 indicates the location of the various circuit controlling devices which make up the apparatus. These devices include the binding posts 12, the potentiometer 13, the rheostat 14, the reversing switch 15, and the tube socket 16.

It will be observed that the circuit diagram indicates as graphically as possible the elements of the circuit. For example, the jagged line 17 associated with the potentiometer 13 represents the winding of the potentiometer and the arrow 18 indicates a connection between the conductor 19 and the finger 20 of the potentiometer. Likewise the jagged line 21 associated with the rheostat 14 represents the winding of the rheostat and the arrow 22 representing the arm of the rheostat suggests clearly how the resistance is varied by turning the rheostat knob.

The portion of the circuit diagram lying between the reversing switch 15 and the tube socket 16 enables the student to tell at a glance what happens when the grid switch 15 is turned from one position to another.

In order to protect the diagram sheet from damage due to exposure and rough handling, a thin sheet of transparent covering material 23 is placed over the diagram sheet. The covering sheet is preferably a cellulose acetate.

The circuit controlling devices are mounted on the panel 10 and either project through the panel as in the case of the binding posts, rheostats, etc. or are arranged over suitable apertures in the panel as in the case of the tube socket 16 (see Fig. 2) to enable the circuit connections to be made by conductors on the under side of the panel. These conductors are shown in Fig. 2, and it will be noticed that they follow in general accord with the circuit diagram shown in Fig. 1.

The edge of the panel is finished with a strip 24 of tin, brass, or similar metal, which is secured in place by screws 25. The screws also serve to fasten the legs 26 to the panel.

In some instances, it may not be necessary to use a complete circuit diagram to give a student the desired information. Certain kinds of apparatus will only require a showing of fragmentary portions of the circuit.

In the modified form of the invention shown in Fig. 5, instead of employing a backing 10 for the diagram sheet, rigidity of structure is obtained by using a relatively thick transparent sheet of self-supporting material, such as Plastacele, a product of the Du Pont Company of Wilmington, Delaware. Glass may be used, but is not as desirable, due to its brittleness and the greater difficulty in drilling holes for mounting the circuit controlling devices. The blue print 11, or other diagram sheet is applied to the bottom of the transparent sheet by adhesive, or other suitable means, so that it is visible from above.

When Plastacele, or an equivalent self-supporting transparent material is used, the marginal strip 24 may be omitted, if desired.

What I claim, therefore, is:

1. In educational apparatus involving an electrical circuit, and one or more circuit controlling devices, a sheet bearing a diagram of the circuit and indicating the position of the circuit controlling devices with respect to the circuit, a transparent covering over the diagram sheet for protecting its surface, said devices being mounted on the diagram sheet in their designated places respectively, with portions extending through the diagram sheet, and conductors connecting the rearwardly projecting portions of the devices in substantial accordance with the diagram sheet whereby a student can tell at a glance the effect which will be produced in the circuit upon manipulating said devices.

2. In educational apparatus involving an electrical circuit, and one or more circuit controlling devices, a sheet bearing a diagram of the circuit and indicating the position of the circuit controlling devices with respect to the circuit, a panel of rigid material furnishing a backing for the diagram sheet, a transparent covering over the diagram sheet for protecting its surface, said devices being mounted on the diagram sheet in their designated places respectively with portions extending through the diagram sheet and panel, and conductors connecting the rearwardly projecting portions of the devices in substantial accordance with the diagram sheet whereby a student can tell at a glance the effect which will be produced in the circuit upon manipulating the said devices.

3. In educational apparatus involving an electrical circuit, and one or more circuit controlling devices, a sheet bearing a diagram of the circuit and indicating the position of the circuit controlling devices with respect to the circuit, a sheet of transparent self-supporting material cemented to the face of the diagram sheet for protecting its surface and for giving it rigidity, said devices being mounted on the diagram sheet in their designated places respectively, with portions extending through the diagram sheet, and conductors connecting the rearwardly projecting portions of the devices in substantial accordance with the diagram sheet whereby a student can tell at a glance the effect which will be produced in the circuit upon manipulating said devices.

4. In educational apparatus involving an electrical circuit, and one or more circuit controlling devices, a panel provided with a circuit diagram sheet which indicates the position of the circuit controlling devices with respect to the circuit, the top of said panel being made of transparent material whereby the diagram is visible from above and is protected from damage, said circuit controlling devices being mounted on the panel in the places designated by the diagram with portions extending through the panel, and conductors connecting the rearwardly projecting portions of the devices in substantial accordance with the diagram sheet whereby a student can tell at a glance the effect which will be produced in the circuit upon manipulating said devices.

5. In educational apparatus involving a circuit, and one or more circuit controlling devices, a panel provided with a circuit diagram sheet which indicates the position of the circuit controlling devices with respect to the circuit, the top of said panel being made of transparent material whereby the diagram is visible from above and is protected from damage, said circuit controlling devices being mounted on the panel in the places designated by the diagram with portions extending through the panel, and connectors joining the rearwardly projecting portions of the devices in substantial accordance with the diagram sheet whereby a student can tell at a glance the effect which will be produced in the circuit upon manipulating said devices.

6. In apparatus of the class described involving a circuit, and one or more circuit controlling devices, a sheet bearing a diagram of the circuit and indicating the position of the circuit controlling device with respect to the circuit, a panel of rigid material furnishing a backing for the diagram sheet, said devices being mounted on the diagram sheet in their designated places respectively, with portions extending through the diagram sheet and panel, and connectors joining the rearwardly projecting portions of the devices in substantial accordance with the diagram sheet whereby a person can tell at a glance the effect which will be produced in a circuit upon manipulating the said devices.

7. In apparatus of the class described involving a circuit, a sheet bearing a diagram of the circuit and indicating the relationship of its component parts, a panel of rigid material furnishing a backing for the diagram sheet and obscuring the physical elements of the circuit, said elements being arranged behind the panel in substantial accordance with the diagram sheet.

8. In apparatus of the class described involving a circuit, a sheet bearing a diagram of the circuit and indicating the relationship of its component parts, a panel of rigid material supporting the sheet so that the diagram is visible from the front, said panel and sheet obscuring the physical elements of the circuit, and said elements being arranged behind the panel in substantial accordance with the diagram sheet.

CARL S. HORNBERGER.